UNITED STATES PATENT OFFICE.

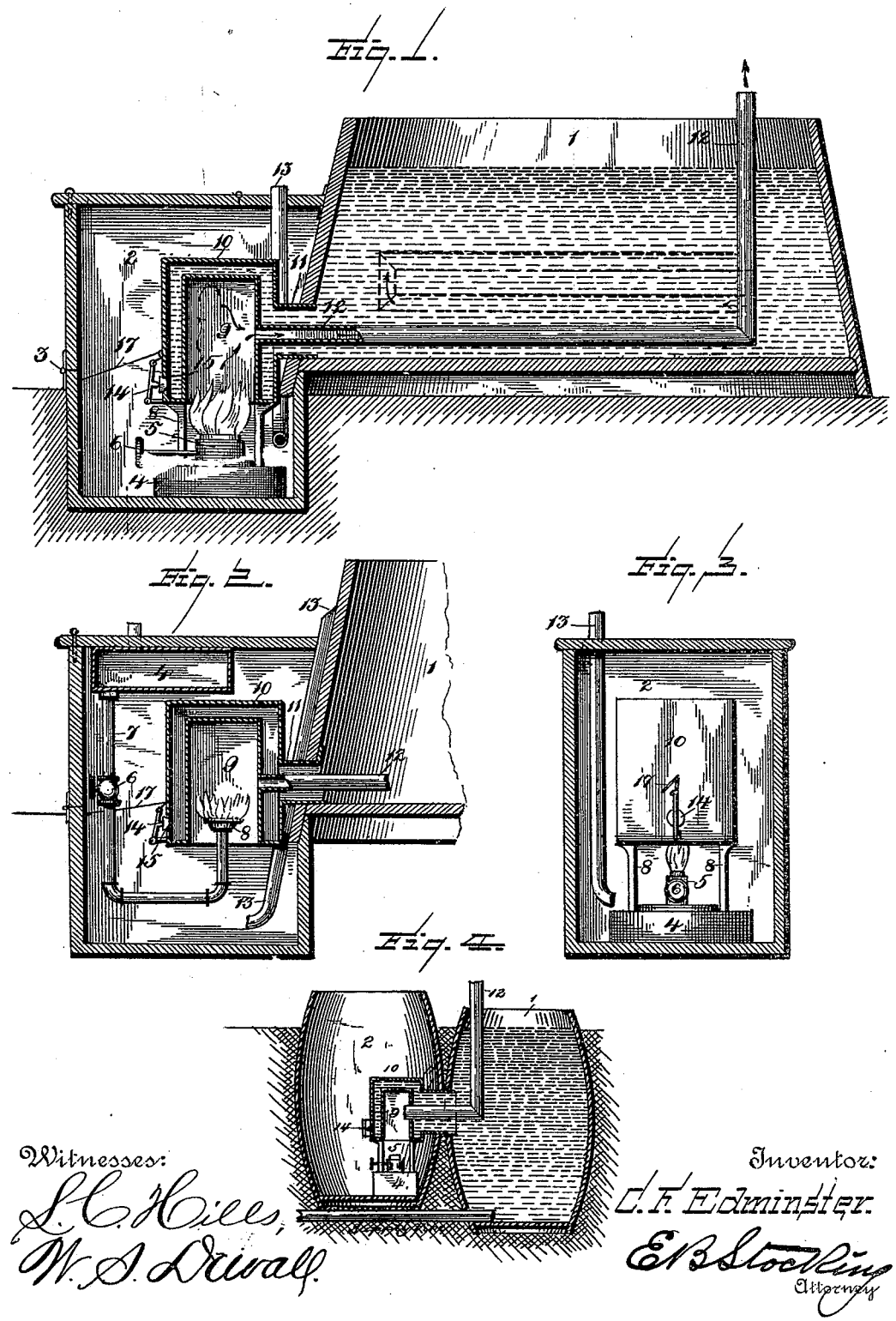

CHARLES F. EDMINSTER, OF TISKILWA, ILLINOIS.

TANK-HEATER.

SPECIFICATION forming part of Letters Patent No. 414,800, dated November 12, 1889.

Application filed May 24, 1888. Serial No. 274,934. (No model.)

*To all whom it may concern:*

Be it known that I, CHARLES F. EDMINSTER, a citizen of the United States, residing at Tiskilwa, in the county of Bureau, State of Illinois, have invented certain new and useful Improvements in Tank-Heaters, of which the following is a specification, reference being had therein to the accompanying drawings.

This invention has relation to cattle-tank heaters employed for preventing water from freezing during cold weather.

The objects and advantages of the invention will hereinafter appear, and the novel features be particularly pointed out in the claim.

Referring to the drawings, Figure 1 is a central longitudinal section of a feed-water tank and heater constructed in accordance with my invention. Fig. 2 is a similar view of a modification of the heater. Fig. 3 is a front elevation of the heater shown in Fig. 1, and Fig. 4 is a modification in vertical section.

Like numerals of reference indicate like parts in all the figures of the drawings.

1 represents an ordinary feed-water tank. At one side, and partly buried in the ground, is a heating-chamber 2, the upper half of which is hinged to the lower half by hinges 3. Within the chamber 2 is mounted an oil-reservoir 4, provided with a burner 5 and suitable regulating device 6. As shown in Fig. 1, the heating device may be of the form described, or, as shown in Fig. 2, the reservoir 4 may be located at the top of the chamber 2 and the burner 5 connected to the reservoir by a feed-pipe 7, and thus vapor or oil be fed to the burner. Mounted above the burner 5, in this instance upon legs 8, is a heat-concentrating drum or dome 9, and surrounding the same is a water jacket or space 10, which communicates with the reservoir 1 through a pipe 11. A smaller pipe 12 passes from the drum 9 through the pipe 11 and into the reservoir 1 and up above the water-level in the same. This pipe 12 may be arranged as shown in Fig. 1, or it may be arranged in a tortuous manner, as shown by dotted lines in said figure.

Water flows from the reservoir into the water-jacket 10, and is heated and produces a circulation through the jacket and tank or reservoir. The heat generated in the dome or drum 9 passes through the smaller pipe 12 and out at the top, thus serving to prevent the water from freezing over and preventing the cattle from drinking. A suitable supply of oxygen is fed to the burner 5 through the medium of a pipe 13, which communicates with the atmosphere outside of the box or chamber 2 and leads down contiguous to said burner.

The chamber 2 may be constructed of sheet metal or other suitable material, but in this instance is built of wood. To guard against the danger of fire and consequent destruction of the device, I provide a valve 14, which is seated in an opening or seat 15, formed in the water-jacket 10. This valve is held to its seat by a string or cord 17, so that should an explosion occur the cord is immediately burned away and the pressure of water in the jacket forces the valve from its seat and permits the water therefrom to flow into the chamber 2, whereby said chamber is flooded and the fire extinguished.

Having described my invention and its operation, what I claim is—

A feed-water tank and attached heating-chamber, said tank and chamber communicating by an opening, in combination with a heating-drum provided with an outer jacket, a portion of which projects into said opening, a pipe communicating with the interior of said drum and extending through said opening into said tank, and a lamp beneath said drum, substantially as described.

In testimony whereof I affix my signature in presence of two witnesses.

CHARLES F. EDMINSTER.

Witnesses:
WILLIAM J. McELROY,
CHARLES M. LEA.